Patented Sept. 3, 1935

2,013,117

UNITED STATES PATENT OFFICE 2,013,117

VULCANIZATION OF RUBBER

William F. Tuley, Nutley, N. J., assignor, by mesne assignments, to United States Rubber Company, New York, N. Y., a corporation of New Jersey No Drawing. Application January 5, 1931, Serial No. 506,737

9 Claims. (Cl. 18—53)

This invention relates to the art of treating rubber or rubber compounds or similar vulcanizable materials and particularly to the provision of an improved procedure for the vulcanization of the same in the presence of an organic accelerator, and of compounds or compositions with which to effect the purpose of the invention.

In the vulcanization of rubber or rubber compounds with the aid of organic accelerators it is desirable to use those accelerators which may be mixed with the rubber or rubber compound without inducing appreciable vulcanizing effect at atmospheric temperature or at slightly elevated temperatures, such as those encountered during milling, calendering, extruding, etc. operations, but which actively accelerate vulcanization at the customary vulcanizing temperatures. Certain accelerators such as those commonly known as "ultra" accelerators or "semi-ultra" accelerators sometimes initiate the vulcanizing reaction prematurely either in the cold or during the mixing etc. operations, resulting in "scorching" or "setting-up" which hinders or entirely prohibits the further use of the rubber or rubber compound. Consequently these compounds require extra precautions in handling to avoid "scorching" etc. It is also known to treat rubber containing certain accelerators with ammonia or amines in order to activate the accelerators or to form more powerful accelerator combinations in the rubber after mixing and before vulcanization, the rubber having been formed into the desired final shape previous to the ammonia treatment. It is also known that acids have a retarding effect on the vulcanization of rubber-sulphur mixtures.

Broadly by this invention an acidic condition is caused to prevail in the rubber during the operations prior to vulcanization; then when it is desired to vulcanize the rubber compound a neutral or basic condition is produced in the rubber compound by means of substances formed by thermal decomposition of materials previously incorporated with the rubber whereby vulcanization is facilitated. Also by the present invention a superior way of utilizing the properties of ammonia or amines has been found which comprises introducing into a rubber compound at the time of mixing an accelerator, particularly an "ultra" or "semi-ultra" accelerator, and a material which is acidic and substantially thermally stable at milling temperatures but which decomposes at higher desired temperatures to yield ammonia or aliphatic amines which form with the ultra or semi-ultra accelerator a more powerful accelerator combination. The materials are further characterized in that they are acidic and hence retard or inhibit vulcanization at ordinary or milling temperatures, but are adapted to decompose to form or yield aliphatic amines or ammonia at vulcanizing temperatures substantially above milling temperatures, which amines or ammonia in turn actively promote per se the vulcanizing reaction, or promote the vulcanizing reaction indirectly by neutralizing the acidic substances present in the rubber.

By the present invention it has also been found that substantial reduction in cost and economy of operation will result when the customary amounts of organic accelerators, particularly the "ultra" or "semi-ultra" accelerators, are substantially reduced and used in conjunction with certain materials to form accelerator compositions.

The materials referred to in conjunction with the organic accelerators—and more especially the "ultra" accelerators or "semi-ultra" accelerators, among which are the thiazyl sulphides such as mercaptobenzothiazole, benzothiazyl monosulphide, benzothiazyl disulphide, and polynitrophenyl benzothiazyl sulphides such as 2-4 dinitrophenyl benzothiazyl sulphide; sulphides such as tetramethyl thiuram disulphide, tetramethyl thiuram monosulphide etc. and their derivatives; esters of N-substituted dithiocarbamic acids such as 2,4-dinitrophenyl dimethyl dithiocarbamate; also the accelerating aldehyde amine condensation products such as heptaldehyde-aniline, butyraldehyde-aniline, etc.—are found to include acidic materials comprising an amido derivative of carbamic acid such as urea and certain substituted ureas which typically include the grouping.

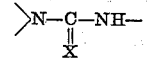

wherein X represents O. Exemplary of such amido derivatives of carbamic acid are the substantially neutral carbamides having the structural formula

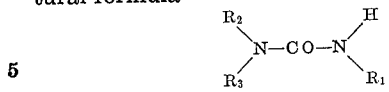

wherein $R_1$ represents hydrogen or an aliphatic hydrocarbon radical, and $R_2$ and $R_3$ represent hydrogen or similar or dissimilar aliphatic or aromatic hydrocarbon radicals, which carbamides are substantially thermally stable at ordinary and milling temperatures, but which are adapted to decompose at vulcanizing temperatures to form or yield aliphatic amines or ammonia. It is preferred to use acidic derivatives of urea or of the mono- or di-substituted ureas such as monomethyl urea, mono-ethyl urea, symmetrical or unsymmetrical dimethyl urea, symmetrical or unsymmetrical diethyl urea, methyl ethyl urea, mono-benzyl urea, mono-phenyl urea, and symmetrical ethyl phenyl urea. Also exemplary of such amido derivatives of carbamic acid are guanidine and dicyandiamide.

Examples of such acidic materials include salts of the above mentioned amides with metal salts of strong acids, such as complex salts of zinc chloride and urea or its homologs; or salts of urea and organic or inorganic acids, such as urea oxalate, urea malate, urea maleate, urea tartrate, urea lactate, urea phthalate, urea benzoate, urea o-chlorobenzoate, urea succinate, urea monochloracetate, urea trichloracetate, urea hydrochloride and urea nitrate; mixtures of the amides with acidic materials such as the acidic materials corresponding to the salts mentioned above, or with acid anhydrides such as phthalic anhydride, or the like.

Among the organic acids which may be used it is preferred to use those having in water at about 20–25° C. an ionic dissociation constant of at least $1 \times 10^{-5}$, and more particularly those having a dissociation constant of at least $1 \times 10^{-3}$. Instead of using zinc chloride, calcium chloride or cadmium chloride may be used, in fact any hydrolyzable metal salt of a strong acid such as that of hydrochloric, nitric, sulphuric, etc. acids. such metal salts are capable of hydrolyzing to give an acid reaction.

The principles employed in the process of this invention are illustrated as follows: Aqueous solutions were prepared containing urea and/or zinc chloride in the proportions given in the table below, and were then heated for 1 hr. at a temperature of 134° C. Determinations of the pH of equally diluted portions of each solution were made both before and after such heating. The results are embodied in the following table:

ular proportions of urea and zinc chloride, was, after heating, substantially neutral or very weakly alkaline; and solutions containing more than one mole of urea per mole of zinc chloride contained, after heating, free ammonia, and were strongly alkaline. All of the solutions as prepared were stable for many weeks at room temperatures and were also found to be stable for seveal hours at temperatures up to 100° C.

It is clear if similar tests are made with acid solutions containing zinc chloride (or other acidic substance) and a substance more strongly basic than urea such as guanidine or dicyandiamide, that the initial acidity of the solutions will decrease with increasing proportions of the basic material; it is also clear that upon heating such solutions whereby ammonia is formed similar changes in the acidity of the solutions will occur to produce less acid, neutral or alkaline conditions depending on the relative proportion of the acidic and basic substances employed.

The following examples in which the parts are by weight illustrate the invention without being limiting thereof:

*Example 1.*—Mercaptobenzothiazole, on the one hand, and mercaptobenbothiazole together with zinc chloride and urea, on the other, were compounded in known manner with rubber, zinc oxide, stearic acid, and sulphur, in the proportions shown in the table, and the mixtures heated in a press at temperatures of 227° F. and 267° F. The results of tensile tests on the vulcanized sheets of rubber are shown in the table.

|  | Parts by weight | |
|---|---|---|
| Rubber | 100 | 100 |
| Zinc oxide | 10 | 10 |
| Stearic acid | 3 | 3 |
| Sulphur | 3 | 3 |
| Mercaptobenzothiazole | 0.2 | 0.3 |
| Zinc chloride (in water) | 0.4 | |
| Urea (in water) | 0.4 | |

| Time of cure | Temperature | Tensile strength (lbs./sq. in.) | |
|---|---|---|---|
| *Minutes* | °F. | | |
| 60 | 227 | No cure | 1450 |
| 120 | 227 | 1357 | 2347 |
| 45 | 267 | 2668 | 2397 |

The cures made at 227° F. serve to indicate the relative scorching tendencies of the respective rubber compounds.

Urea was compounded with rubber in the proportion of 0.5 part of urea, 100 parts of rubber, 10 parts of zinc oxide, 3 parts of stearic acid, and

| | Composition of solution | | | Molar ratio urea to zinc chloride | Initial pH[1] before heating | pH[2] after heating 1 hour at 134° C. |
|---|---|---|---|---|---|---|
| | Water | Zinc chloride | Urea | | | |
| | *Grams* | *Grams* | *Grams* | | | |
| A | 20 | 13.6 | None | 0 | 6.2 | 6.2 |
| B | 20 | 13.6 | 6 | 1.1 | 6.2 | 7.2 |
| C | 20 | 13.6 | 12 | 2.1 | 6.2 | 10 |
| D | 20 | 13.6 | 18 | 3.1 | 6.2 | 10 |
| E | 20 | 13.6 | 24 | 4.1 | 6.2 | 10 |

[1] Brom-cresol purple indicator.
[2] La Motte purple indicator.

All of the prepared solutions were acid initially and the pH values before heating were substantially independent of the amount of urea present. Furthermore the solution containing equi-molec- 3 parts of sulphur, and a portion of the mixture heated in a press for 45′ at a temperature of 227° F. The rubber was then found to be uncured. Another portion of the mixture was heated in a press for 45′ at 267° F., and was then tested and found to have a tensile strength of 1045 lbs./sq. in. In view of the above data and of the fact that unvulcanized rubber possesses a tensile strength of approximately 500 lbs./sq. in., it is evident that the accelerating effect produced by the urea per se was negligible.

*Example 2.*—Rubber compounds containing the ingredients indicated in the table below were mixed in known manner, and the mixtures heated in a press for the periods and at the temperatures indicated. The results of tensile tests are shown in the following table:

| Rubber | 100 | 100 |
|---|---|---|
| Zinc oxide | 10 | 10 |
| Heptaldehyde-aniline condensation product diluted with spindle oil | 0.5 | 0.5 |
| Sulphur | 3 | 3 |
| Zinc chloride | 0.4 | |
| Urea | 0.3 | |

| Time of cure | Temperature | Tensile strength (lbs./sq. in.) | |
|---|---|---|---|
| *Minutes* | *° F.* | | |
| 120 | 227 | No cure | 533 |
| 15 | 293 | 939 | 2730 |
| 45 | 293 | 3646 | 3459 |
| 75 | 293 | 3724 | 3201 |
| 105 | 293 | 3463 | 3306 |

*Example 3.*—Rubber compounds suitable for use in the manufacture of inner tubes were mixed, in known manner, according to the formulæ in the accompanying table, and portions of each mixture were vulcanized by heating in a press for varying lengths of time at a temperature of 307° F. The optimum curing time was found to be 4½ minutes, for each of the four mixtures. Other portions of each mixture were continuously subjected to milling action on the rolls of a mixing mill at a temperature of 220° F., until scorching took place, as evidenced by "lumpiness" of the mix, or its failure to run smoothly on the rolls. The milling time required to effect scorching of each mix is shown in the table:

| Crude rubber | 91 | 91 | 100 | 100 |
|---|---|---|---|---|
| Reclaimed rubber | 10 | 10 | | |
| Butyraldehyde-aniline condensation product | 0.75 | 0.75 | 1.0 | 1.0 |
| Zinc oxide | 10 | 10 | 10 | 10 |
| Blanc fixe | 20.75 | 20.75 | 31 | 31 |
| Stearic acid | 4 | 4 | 4 | 4 |
| Sulphur | 2 | 2 | 2 | 2 |
| Zinc chloride | | 0.125 | | 0.125 |
| Urea | | 0.1875 | | 1.0 |
| Time in min., required to scorch on mill at 220° F | 8 | 11 | 3 | 19 |

*Example 4.*—Rubber compositions suitable for use in the manufacture of tire treads were mixed, in known manner, according to the formulæ in the accompanying table, and portions of each mixture were vulcanized by heating for the periods and at the temperatures indicated. The vulcanized sheets of rubber were then tested for tensile strength and for relative wear (resistance to abrasion). The results are shown in the following table:

| Rubber | 100 | 100 |
|---|---|---|
| Gas black | 42 | 42 |
| Pine tar | 3.5 | 3.5 |
| Zinc oxide | 5 | 5 |
| Stearic acid | 1.25 | 1.25 |
| Sulphur | 3.25 | 3.25 |
| Mercaptobenzothiazole | 1.25 | 0.4 |
| Zinc chloride | | 0.8 |
| Urea | | 0.7 |

| Time of cure | Temperature | Tensile strength (lbs./sq.in.) | |
|---|---|---|---|
| *Minutes* | *° F.* | | |
| 60 | 227 | 1095 | 763 |
| 120 | 227 | 3312 | 2925 |
| 30 | 267 | 3523 | 3394 |
| 45 | 267 | 4023 | 4131 |
| 60 | 267 | 4120 | 4107 |
| 75 | 267 | 4216 | 4310 |
| 90 | 267 | 4136 | 4224 |

| | | Relative wear | |
|---|---|---|---|
| 30 | 267 | 102 | 94 |
| 45 | 267 | 109 | 109 |
| 60 | 267 | 117 | 124 |
| 75 | 267 | 121 | 125 |
| 90 | 267 | 130 | 142 |

It is clear that by the use of an accelerator composition containing such as mercaptobenzothiazole and zinc chloride salt of urea as illustrated in the second mixture of this example, substantial savings, at present market prices, may be effected in the cost of the rubber compound, without sacrifice of any of the desirable physical properties of the rubber compound.

*Example 5.*—Rubber compounds containing the ingredients indicated in the table below were mixed in known manner, and portions of the mixtures were heated in a press for the periods and at temperatures given by steam at the pressures indicated. Results of tensile tests are shown in the following table:

| Rubber | 100 | 100 |
|---|---|---|
| Zinc oxide | 10 | 10 |
| Stearic acid | 3 | 3 |
| Sulphur | 3 | 3 |
| Mercaptobenzothiazole | 0.3 | 0.3 |
| Zinc chloride | | 0.4 |
| Mono-methyl urea | | 0.5 |

| Time of cure (minutes) | Steam pressure (lbs./sq. in.) | Tensile strength (lbs./sq. in.) | |
|---|---|---|---|
| 75 | 5 | Slight cure. | Slight cure. |
| 45 | 25 | 2105 | 3247 |
| 60 | 25 | 2259 | 4121 |
| 30 | 35 | 1734 | 3688 |
| 45 | 35 | 2323 | 4381 |

*Example 6.*—Rubber compositions were prepared according to the formulæ given below, and were then heated in a press as indicated. The tensile strength of the resulting rubber products are shown in the table:

| Rubber | 100 | 100 | 100 |
|---|---|---|---|
| Zinc oxide | 10 | 10 | 10 |
| Sulphur | 3 | 3 | 3 |
| Heptaldehyde-aniline condensation product | 0.2 | 0.2 | 0.2 |
| Urea | | 0.3 | 0.5 |
| Zinc chloride | | 0.4 | |
| Phthalic anhydride | | | 0.5 |

| Time of cure | Temperature | Tensile strength (lbs./sq. in.) | | |
|---|---|---|---|---|
| *Minutes* | *° F.* | | | |
| 120 | 227 | 1795 | 428 | 793 |
| 10 | 292 | 3265 | 1892 | 2226 |
| 20 | 292 | 4047 | 4042 | 4211 |
| 30 | 292 | 4513 | 4580 | 4442 |

Instead of the accelerators mentioned, other accelerators may be used such as 2,4-dinitrophenyl diethyl dithiocarbamate, 2,6-dinitro-4-chlorophenyl dimethyl dithiocarbamate, picryl dimethyl dithiocarbamate, phenyl-methylene bis-(dimethyl dithiocarbamate), phenyl-methylene bis-(diethyl dithiocarbamate); substituted mercaptobenzothiazoles containing substituents such as alkyl, alkoxyl, amino, halogen, or nitro groups in the benzene nucleus; thiocarbanilide; reaction products of carbon disulphide with aldehyde-amine condensation products, such as the carbon disulphide derivative of butyraldehyde-aniline condensation product, and the reaction product of carbon disulphide with the condensation product of formaldehyde and piperidine.

The acidic materials comprising an amido derivative of carbamic acid, may be incorporated with the rubber composition in any desired manner. The preformed composition may be added as such, or the acidic material and the amido derivative may be each added separately to the rubber compound or composition, at a time prior to the actual vulcanization operation, whereby to effect the described purposes of the invention. The materials may be incorporated directly, or in a "master batch", with the rubber mix on the mill, or by first mixing intimately with the chosen organic accelerator, mechanically or by means of a mutual solvent and adding the solution or the material recovered therefrom by evaporation of the solvent to the rubber on the mill, or by dispersing the materials in a liquid medium such as by grinding them into a paste or dispersion with an oil. If desired the materials may be dissolved or dispersed in latex (natural or artificial) and the latex containing the same then added to the rubber compound on the mill. It is also clear that the process of this invention may be applied in the production of rubber articles from vulcanizable latex compositions.

The invention may be used variously, for instance in the production of rubber articles which are press cured or mold cured, such as tires, inner tubes, etc.

It is to be understood that the invention includes the use of acidic materials having substantial vulcanization-retarding properties and that where the expression "acid" or "acidic" occurs herein, acidic materials such as the higher fatty acids, for example, stearic, oleic etc. acids, which have substantially no effective vulcanization-retarding action are not to be included within such expression.

It is also to be understood that the expression "aliphatic hydrocarbon radicals" is to be construed to include both open chain and alicyclic hydrocarbon radicals which may be either saturated or unsaturated, and also aralkyl radicals.

This case is a continuation-in-part of case Serial No. 503,521, filed December 19, 1930, now United States Patent No. 1,904,573.

While a detailed description of the invention is given above, it is to be understood that various modifications will suggest themselves,—for instance various compounding ingredients including anti-agers etc. may be used in conjunction with the acceleration compositions,—as will be clear to those skilled in the art,—all without departing from the spirit of the invention—and the invention is not to be limited except as indicated in the appended claims.

Having thus described my invention, what I claim and desire to protect by Letters Patent is:

1. A process of producing vulcanized rubber which comprises incorporating in rubber mercaptobenzothiazole and an acidic salt comprising an amido derivative of carbamic acid adapted to decompose at vulcanizing temperatures to yield ammonia or an aliphatic amine, and vulcanizing the rubber.

2. A process of producing vulcanized rubber which comprises incorporating in rubber an organic accelerator and an acidic salt of a polybasic organic acid and urea, and vulcanizing the rubber.

3. A process of producing a vulcanized rubber product which comprises incorporating in rubber a thiazyl sulphide vulcanization accelerator and an acidic salt comprising an amido derivative of carbamic acid adapted to decompose at vulcanization temperatures to form amine or ammonia whereby to promote the vulcanization reaction, and vulcanizing the rubber.

4. A process of producing a vulcanized rubber product which comprises incorporating in rubber an organic accelerator and an acidic salt of a substantially neutral carbamide of the urea series adapted to decompose at vulcanization temperatures to form amine or ammonia whereby to promote the vulcanization reaction, and vulcanizing the rubber.

5. A process of producing a vulcanized rubber product which comprises incorporating in rubber an organic accelerator and an acidic salt of an organic acid and a substantially neutral carbamide of the urea series adapted to decompose at vulcanization temperatures to form amine or ammonia whereby to promote the vulcanization reaction, and vulcanizing the rubber.

6. A process of producing a vulcanized rubber product which comprises incorporating in rubber an organic accelerator and a salt of an organic acid and a substantially neutral carbamide of the urea series adapted to decompose at vulcanization temperatures to yield amine or ammonia, and vulcanizing the rubber.

7. A process of producing a vulcanized rubber product which comprises incorporating in rubber an organic accelerator and an acidic salt of a polybasic organic acid and a substantially neutrl carbamide of the urea series adapted to decompose at vulcanization temperatures to yield ammonia or an aliphatic amine, and vulcanizing the rubber.

8. A process of producing a vulcanized rubber product which comprises incorporating in rubber a thiazyl sulphide vulcanization accelerator and an acidic salt of a polybasic organic acid and an amido derivative of carbamic acid adapted to decompose at vulcanization temperatures to form amine or ammonia whereby to promote the vulcanization reaction, and vulcanizing the rubber.

9. A process of producing a vulcanized rubber product which comprises incorporating in rubber a thiazyl sulphide vulcanization accelerator and an acidic salt of a polybasic organic acid and urea, and vulcanizing the rubber.

WILLIAM F. TULEY.